United States Patent
Oh et al.

(10) Patent No.: US 12,062,786 B2
(45) Date of Patent: Aug. 13, 2024

(54) POSITIVE ACTIVE MATERIAL FOR RECHARGEABLE LITHIUM BATTERY, METHOD OF PREPARING THE SAME, POSITIVE ELECTRODE FOR RECHARGEABLE LITHIUM BATTERY INCLUDING THE SAME AND RECHARGEABLE LITHIUM BATTERY INCLUDING THE SAME

(71) Applicant: Samsung SDI Co., Ltd., Yongin-si (KR)

(72) Inventors: Eunok Oh, Yongin-si (KR); Yumi Song, Yongin-si (KR); Jeuk Ha, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 434 days.

(21) Appl. No.: 16/940,637

(22) Filed: Jul. 28, 2020

(65) Prior Publication Data

US 2021/0036319 A1    Feb. 4, 2021

(30) Foreign Application Priority Data

Aug. 2, 2019    (KR) .................. 10-2019-0094372

(51) Int. Cl.
*H01M 4/525*    (2010.01)
*H01M 4/505*    (2010.01)
(Continued)

(52) U.S. Cl.
CPC ........... *H01M 4/525* (2013.01); *H01M 4/505* (2013.01); *H01M 10/0525* (2013.01);
(Continued)

(58) Field of Classification Search
CPC .. H01M 4/525; H01M 4/505; H01M 10/0525; H01M 10/44; H01M 2004/021; H01M 2004/027; H01M 2004/028
See application file for complete search history.

(56) References Cited

U.S. PATENT DOCUMENTS 9,184,443 B2    11/2015 Lee et al.
9,660,291 B2 *  5/2017 Kim .................. C01G 53/006
(Continued)

FOREIGN PATENT DOCUMENTS

CN    1877896 A  * 12/2006  .......... H01M 10/052
JP    3769344 B2 *  4/2006
(Continued)

OTHER PUBLICATIONS

High Voltage and High Capacity Characteristics of LiNi1/3Co1/3Mn1/3O2 Cathode for Lithium Battery Applications, Periasamy et al (Year: 2007).*

(Continued)

*Primary Examiner* — Jonathan G Jelsma
(74) *Attorney, Agent, or Firm* — Lewis Roca Rothgerber Christie LLP

(57) ABSTRACT

A positive active material for a rechargeable lithium battery includes a first compound represented by Chemical Formula 1 and a second compound represented by Chemical Formula 2, the second compound having a smaller particle size than that of the first compound, wherein cation mixing in the surface portion of the positive active material is less than or equal to about 7.5%, cation mixing in the bulk of the positive active material is less than or equal to about 3%, a residual lithium content on the surface of the positive active material is less than or equal to about 3,000 ppm, and the first compound and the second compound each independently include 90 at % to about 98 at % of Ni with respect to the metals excluding Li.

$$\text{Li}_{a1}\text{Ni}_{x1}\text{Co}_{y1}\text{M}^1{}_{1-x1-y1}\text{O}_2, \quad \text{Chemical Formula 1}$$

$$\text{Li}_{a2}\text{Ni}_{x2}\text{Co}_{y2}\text{M}^2{}_{1-x2-y2}\text{O}_2. \quad \text{Chemical Formula 2}$$

10 Claims, 4 Drawing Sheets

(51) Int. Cl.
*H01M 10/0525* (2010.01)
*H01M 10/44* (2006.01)
*H01M 4/02* (2006.01)

(52) U.S. Cl.
CPC ...... *H01M 10/44* (2013.01); *H01M 2004/021* (2013.01); *H01M 2004/027* (2013.01); *H01M 2004/028* (2013.01)

(56) References Cited

U.S. PATENT DOCUMENTS

| | | | | |
|---|---|---|---|---|
| 2014/0377659 | A1* | 12/2014 | Oljaca | H01M 4/525 |
| | | | | 429/231.95 |
| 2015/0010819 | A1 | 1/2015 | Lee et al. | |
| 2015/0228969 | A1* | 8/2015 | Cho | H01M 4/366 |
| | | | | 429/223 |
| 2019/0300382 | A1* | 10/2019 | Kim | C01G 53/42 |
| 2020/0136126 | A1* | 4/2020 | Hong | H01M 10/0525 |
| 2020/0144602 | A1 | 5/2020 | Hong et al. | |
| 2020/0287215 | A1* | 9/2020 | Kim | H01M 4/525 |
| 2020/0350555 | A1 | 11/2020 | Park et al. | |

FOREIGN PATENT DOCUMENTS

| | | | |
|---|---|---|---|
| JP | 2015-015230 A | 1/2015 | |
| KR | 10-2004-0026378 A | 3/2004 | |
| KR | 10-2015-0006283 A | 1/2015 | |
| KR | 10-1785262 B1 | 10/2017 | |
| KR | 10-2018-0077026 A | 7/2018 | |
| KR | 10-2019-0046425 A | 5/2019 | |
| KR | 10-2019-0046426 A | 5/2019 | |
| KR | 10-2020-0050747 A | 5/2020 | |
| WO | WO-2019177017 A1 * | 9/2019 | ............ C01G 53/40 |

OTHER PUBLICATIONS

Modified translation of CN-1877896-A as taught by Jiao et al. (Year: 2006).*
Modified translation of JP-3769344-B2 as taught by Yamazaki et al(JPH10208728A is the equivalent of JP3769344) (Year: 2006).*
Encapsulation of LiNi0.5Co0.2Mn0.3O2 with a thin inorganic electrolyte film to reduce gas evolution in the application of lithium ion batteries†Yongseon Kim* (Year: 2013).*
WO2019177017A1 english translation as taught by Anakamura (Year: 2019).*
Korean Intellectual Property Office Action for corresponding Korean Patent Application No. 10-2019-0094372, dated Oct. 19, 2020, 7 pages.
KIPO Notice of Allowance dated Mar. 18, 2021 in corresponding Korean Patent Application No. 10-2019-0094372, 7 pages.

* cited by examiner

POSITIVE ACTIVE MATERIAL FOR RECHARGEABLE LITHIUM BATTERY, METHOD OF PREPARING THE SAME, POSITIVE ELECTRODE FOR RECHARGEABLE LITHIUM BATTERY INCLUDING THE SAME AND RECHARGEABLE LITHIUM BATTERY INCLUDING THE SAME

CROSS-REFERENCE TO RELATED APPLICATION

This application claims priority to and the benefit of Korean Patent Application No. 10-2019-0094372, filed in the Korean Intellectual Property Office on Aug. 2, 2019, the entire content of which is incorporated herein by reference.

BACKGROUND

1. Field

One or more aspects of embodiments of the present disclosure relate to a positive active material for a rechargeable lithium battery, a method for preparing the same, and a positive electrode and a rechargeable lithium battery including the same.

2. Description of the Related Art

In order to meet down-sizing and high performance specifications of various electronic devices, rechargeable lithium batteries having high energy density have become increasingly important for device down-sizing and weight reduction. In addition, high capacity and high temperature and voltage stability of rechargeable lithium batteries is important for applications in electric vehicles and/or the like.

Various positive active materials have been investigated for rechargeable lithium batteries.

High-Ni-based positive active materials have been generally prepared using additional washing and drying processes to remove residual lithium on the surface, which can deteriorate performance and stability. These additional washing processes may not only increase production costs, but also damage of the surface of the positive active material and increasing cation mixing. An additional process of coating the active material may be performed to supplement lithium (Li) removed during the washing and recover the damaged surface, but this coating process is a wet coating process to increase coating uniformity, which increases costs.

SUMMARY

One or more aspects of embodiments of the present disclosure are directed toward a high nickel-based positive active material (e.g., a positive active material with a high proportion of nickel (Ni) content) having high capacity, high efficiency, and improved structural stability due to controlled or reduced cation mixing while reducing residual lithium on the surface of the positive active material.

One or more aspects of embodiments of the present disclosure are directed toward a method of preparing the positive active material.

One or more aspects of embodiments of the present disclosure are directed toward a positive electrode including the positive active material.

One or more aspects of embodiments of the present disclosure are directed toward a rechargeable lithium battery including the positive active material.

One or more example embodiments of the present disclosure provide a positive active material for a rechargeable lithium battery including a first compound represented by Chemical Formula 1 and a second compound represented by Chemical Formula 2, the second compound having a smaller particle size (average particle diameter) than the first compound, wherein the first compound and the second compound may each independently include Ni in an amount of about 90 at % to about 98 at % with respect to 100 at % of metals excluding Li. A degree of cation mixing in the surface portion of the positive active material may be less than or equal to about 7.5%, a degree of cation mixing in the bulk of the positive active material may be less than or equal to about 3%, and a concentration of residual lithium on the surface of the positive active material may be less than or equal to about 3,000 ppm.

Chemical Formula 1

$Li_{a1}Ni_{x1}Co_{y1}M^{1}{}_{1-x1-y1}O_{2}$.

In Chemical Formula 1, $0.9 \leq a1 \leq 1.05$, $0.9 \leq x1 \leq 0.98$, $0.01 \leq y1 \leq 0.09$, and $M^{1}$ may be at least one element selected from manganese (Mn), aluminum (Al), chromium (Cr), iron (Fe), vanadium (V), magnesium (Mg), titanium (Ti), zirconium (Zr), niobium (Nb), molybdenum (Mo), tungsten (W), copper (Cu), zinc (Zn), gallium (Ga), indium (In), tin (Sn), lanthanum (La), and cerium (Ce).

Chemical Formula 2

$Li_{a2}Ni_{x2}Co_{y2}M^{2}{}_{1-x2-y2}O_{2}$.

In Chemical Formula 2, $0.9 \leq a2 \leq 1.05$, $0.9 \leq x2 \leq 0.98$, $0.01 \leq y2 \leq 0.09$, and $M^{2}$ may be at least one element selected from Mn, Al, Cr, Fe, V, Mg, Ti, Zr, Nb, Mo, W, Cu, Zn, Ga, In, Sn, La, and Ce.

The first compound may have an average particle diameter of about 15 μm to about 20 μm, and the second compound may have an average particle diameter of about 2 μm to about 5 μm.

The second compound may be included in an amount of about 10 wt % to about 50 wt % based on a total amount of the first compound and the second compound.

The second compound may have a needle shape, a plate shape, or a combination thereof.

The positive active material may have a BET specific surface area of less than or equal to about 0.5 m²/g.

The positive active material may have an exothermic peak at a temperature of about 190° C. to about 210° C. when measured by differential scanning calorimetry (DSC).

The positive active material may have a mixture density of about 3.2 g/cm³ to about 3.7 g/cm³.

One or more example embodiments of the present disclosure provide a method of preparing a positive active material that includes mixing a Compound 1A represented by Chemical Formula 1A, a Compound 2A represented by Chemical Formula 2A, the Compound 2A having a smaller particle size than the Compound 1A, and a lithium salt to prepare a mixture; subjecting the mixture to a first heat treatment under a rapid temperature increase condition to produce a first fired product including residual lithium; and subjecting the first fired product to a second heat treatment to prepare a positive active material.

Chemical Formula 1A $Ni_{x1}Co_{y1}M^{1}{}_{1-x1-y1}(OH)_{2}$.

In Chemical Formula 1A, $0.9 \leq x1 \leq 0.98$, $0.01 \leq y1 \leq 0.09$, and $M^{1}$ may be at least one element selected from Mn, Al, Cr, Fe, V, Mg, Ti, Zr, Nb, Mo, W, Cu, Zn, Ga, In, Sn, La, and Ce.

Chemical Formula 2A $Ni_{x2}Co_{y2}M^{2}{}_{1-x2-y2}(OH)_{2}$.

In Chemical Formula 2A, $0.9 \leq x2 \leq 0.98$, $0.01 \leq y2 \leq 0.09$, and $M^{2}$ may be at least one element selected from Mn, Al, Cr, Fe, V, Mg, Ti, Zr, Nb, Mo, W, Cu, Zn, Ga, In, Sn, La, and Ce.

A mole ratio of Li/(Ni Co Mn) in the mixture may be greater than or equal to about 0.99.

The Compound 2A may be included in an amount of about 10 wt % to about 50 wt % based on a total amount of 100 wt % of the Compound 1A and Compound 2A.

The rapid temperature increase condition may include raising a temperature at about 3° C./min to about 6° C./min.

The first heat treatment may include maintaining the mixture at about 800° C. to about 1000° C. for about 1 hour to about 4 hours in an air atmosphere or an oxidizing gas atmosphere.

The Compound 2A may have a needle shape, a plate shape, or a combination thereof.

One or more example embodiments of the present disclosure provide a rechargeable lithium battery including a positive electrode including the positive active material; a negative electrode; and an electrolyte between the positive electrode and the negative electrode.

A degree of cation mixing of the positive active material may be reduced, thereby improving charging and discharging efficiency of the battery.

The generation of unreacted residual lithium and gas on the surface of the positive active material may be reduced to improve the phase stability and cycle-life characteristics of the battery.

DETAILED DESCRIPTION

Hereinafter, embodiments of the present disclosure will be described in more detail with reference to the accompanying drawings. However, these embodiments are examples, the present disclosure is not limited thereto and the present disclosure is defined by the scope of claims. Like reference numerals in the drawings denote like elements throughout, and duplicative descriptions thereof may not be provided.

As used herein, when an element such as a layer, film, region, or substrate is referred to as being "on" another element, it may be directly on the other element or intervening elements may also be present. When an element is referred to as being "directly on," "another element, no intervening elements are present.

As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, expressions such as "at least one of," "one of," and "selected from," when preceding a list of elements, modify the entire list of elements and do not modify the individual elements of the list.

As used herein, the term "and/or" includes any and all combinations of one or more of the associated listed items. Further, the use of "may" when describing embodiments of the present disclosure refers to "one or more embodiments of the present disclosure".

One or more example embodiments of the present disclosure provide a positive active material for a rechargeable lithium battery including a first compound represented by Chemical Formula 1 and a second compound represented by Chemical Formula 2, the second compound having a smaller particle size (average particle diameter) than the first compound, wherein the first compound and the second compound may each independently include Ni in an amount of about 90 at % to about 98 at % with respect to 100 at % of metals excluding Li, a degree of cation mixing in the surface portion of the positive active material may be less than or equal to about 7.5%, a degree of cation mixing in the bulk of the positive active material may be less than or equal to about 3%, and a concentration of residual lithium on the surface of the positive active material may be less than or equal to about 3,000 ppm:

$$Li_{a1}Ni_{x1}Co_{y1}M^{1}{}_{1-x1-y1}O_2.$$  Chemical Formula 1

In Chemical Formula 1, 0.9≤a1≤1.05, 0.9≤x1≤0.98, 0.01≤y1≤0.09, and $M^1$ may be at least one element selected from manganese (Mn), aluminum (Al), chromium (Cr), iron (Fe), vanadium (V), magnesium (Mg), titanium (Ti), zirconium (Zr), niobium (Nb), molybdenum (Mo), tungsten (W), copper (Cu), zinc (Zn), gallium (Ga), indium (In), tin (Sn), lanthanum (La), and cerium (Ce).

$$Li_{a2}Ni_{x2}Co_{y2}M^{2}{}_{1-x2-y2}O_2.$$  Chemical Formula 2

In Chemical Formula 2, 0.9≤a2≤1.05, 0.9≤x2≤0.98, 0.01≤y2≤0.09, and $M^2$ may be at least one element selected from Mn, Al, Cr, Fe, V, Mg, Ti, Zr, Nb, Mo, W, Cu, Zn, Ga, In, Sn, La, and Ce.

In the first compound and the second compound, the Ni content is represented by x1 and x2 in Chemical Formulae 1 and 2, respectively, and may be about 90 at % to about 98 at %. For example, in the first compound and the second compound, atomic concentrations of Ni with respect to 100 at % of the metals excluding Li may each independently be 90 at % to 98 at %, for example, greater than or equal to about 90 at %, greater than or equal to about 91 at %, greater than or equal to about 92 at %, or greater than or equal to about 93 at %, and less than or equal to about 98 at %, less than or equal to about 97 at %, less than or equal to about 96 at %, less than or equal to about 95 at %, or less than or equal to about 94 at %. When the Ni content of each compound is within the above-described range, the content of Ni involved in charge and discharge (e.g., the amount of Ni available for redox during charge and discharge) is increased, and accordingly, battery capacity may be improved. However, when the Ni content is less than about 90 at %, the capacity of the battery may be limited, and when the Ni content is greater than about 98 at %, some Li sites are substituted with Ni and fail in securing enough Li to contribute to the charge and discharge (e.g., Li and Ni cation mixing may occur, decreasing the amount of Li available during charge and discharge), and accordingly, capacity may be deteriorated. In addition, as a concentration of residual Li on the surface of the positive active material is increased, gas may be generated from one or more side reactions with an electrolyte solution, such that swelling may occur, and high temperature safety may be deteriorated.

In the first compound and the second compound, a Co content is represented by y1 and y2 in Chemical Formulae 1 and 2, respectively, and may be about 1 at % to about 9 at %. For example, in the first compound and the second compound, atomic concentrations of cobalt (Co) with respect to 100 at % of the metals excluding Li may each independently be about 1 at % to about 9 at %, for example, about 2 at % to about 6 at %, about 2.5 at % to about 6 at %, or about 2.5 at % to about 5 at %. In Chemical Formulae 1 and 2, when the Co content is within the above-described ranges, an efficiency ratio of capacity improvement over cost may be maximized or increased. In addition, in Chemical Formulae 1 and 2, $M^1$ and $M^2$ may each independently be Mn, Al, or a combination thereof, and these metal elements may improve the stability of the active material and resultantly, the stability of a battery containing the active material. In order to achieve these improvements, in the first and second compounds, the content of the metal elements $M^1$ and $M^2$ may be represented by 1−x1−y1 and 1−x2−y2 in Chemical Formulae 1 and 2, respectively, and may each independently be about 1 at % to about 9 at %. For example, in the first and second compounds, the atomic concentrations of $M^1$ and $M^2$ with respect to 100 at % of metals excluding Li may each independently be about 1 at % to about 9 at %, for example, about 1 at % to about 4 at %, or about 1 at % to about 3 at %. In Chemical Formulae 1 and 2, when the $M^1$ and $M^2$ contents are within the above-described ranges, battery stability may be effectively improved.

The positive active material according to an embodiment may include an NCM-based lithium composite transition metal oxide including nickel (Ni), cobalt (Co), and manganese (Mn) or an NCA-based lithium composite transition metal oxide including Ni, Co, and aluminum (Al). In some embodiments, the positive active material may include a quaternary lithium composite transition metal oxide essentially including four components of Ni, Co, Mn, and Al.

In the positive active material for a rechargeable lithium battery, the second compound may have a smaller average particle diameter (D50) than the first compound, for example, the average particle diameter of the first compound may be greater than or equal to about 15 μm, greater than or equal to about 16 μm, or greater than or equal to about 17 μm, or greater than or equal to about and less than or equal to about 20 μm, less than or equal to about 19 μm, or less than or equal to about 18 μm; and the average particle diameter of the second compound may be greater than or equal to about 2 μm, greater than or equal to about 3 μm, or greater than or equal to about and less than or equal to about 5 μm or less than or equal to about 4 μm. In some embodiments, the first and second compounds may have an average particle diameter difference of greater than or equal to about 10 μm, greater than or equal to about 11 μm, greater than or equal to about 12 μm, or greater than or equal to about 13 μm and less than or equal to about 18 μm, less than or equal to about 17 μm, or less than or equal to about 16 μm. When the first and second compounds have average particle diameters within the above-described ranges, the mixture density of the positive active material may be increased, and as a result, battery capacity and high rate capability may be improved.

As described above, when a lithium composite transition metal oxide including the first and second compounds having different average particle diameters (e.g., a bimodal lithium composite transition metal oxide) is used as a positive active material, battery capacity and high rate capability may be improved, due in part to an increase in mixture density. The second compound (a small diameter oxide) may be produced from a reaction of unreacted residual lithium (e.g., surface lithium generated during the first heat treatment) with Compound 2A (a small diameter material precursor), for example, a large amount of residual lithium generated during the preparation of the high nickel-based lithium composite transition metal oxide may be efficiently removed via a heat treatment alone, without additional washing and drying processes, and as a result, side reactions of the residual lithium with an electrolyte solution may be suppressed or reduced to thereby improve high temperature stability.

The second compound may be included in an amount of about 10 wt % to about 50 wt %, for example, about 10 wt % to about 40 wt %, or about 10 wt % to about 30 wt % based on a total amount of the first compound and the second compound. When the content of the second compound is included in the above range, a mixture density of the positive active material may be increased, and the volumetric capacity (e.g., specific energy) of the battery may be improved by suppressing or reducing swelling from gas generation at high voltage and high temperature.

In the positive active material, the second compound may have a needle shape, a plate shape, or a combination thereof. When the second compound has this shape, a mixture density of the positive active material may be increased, and thus, capacity and/or charge/discharge efficiency of the battery may be improved.

A degree of cation mixing in the surface portion of the positive active material according to the embodiment may be less than or equal to about 7.5%, and a degree of cation mixing in the bulk of the positive active material may be less than or equal to about 3%. The degree of cation mixing in the surface portion of the positive active material may be, for example, less than or equal to about 7.0%, less than or equal to about 6.9%, less than or equal to about 6.8%, less than or equal to about 6.7%, less than or equal to about 6.6%, less than or equal to about 6.5%, less than or equal to about 6.4%, less than or equal to about 6.3%, or less than or equal to about 6.2%. In some embodiments, the degree of cation mixing in the bulk of the positive active material may be for example, less than or equal to about 2.9%, less than or equal to about 2.8%, less than or equal to about 2.7%, less than or equal to about 2.6%, less than or equal to about 2.5%, or less than or equal to about 2.4%.

As used herein, the term "cation mixing" refers to a phenomenon in which $Li^+$ (0.76 Å) and $Ni^{2+}$ (0.69 Å) cations having similar ion radiuses swap in each other's crystal sites (e.g., $Li^+$ migrates to and occupies a $Ni^{2+}$ site, and vice versa). For example, because nickel tends to energetically favor a divalent ($Ni^{2+}$) valence to trivalent ($Ni^{3+}$) valence and $Ni^{2+}$ has a similar ion radius to $Li^+$, $Ni^{2+}$ may be mixed into vacant lithium sites during volatilization of raw lithium salt precursor materials during firing at high temperature, thereby unwantedly generating a lithium nickel oxide having a non-stoichiometric composition. The $Ni^{2+}$ mixed in the lithium sites may not only hinder diffusion of lithium ions, but also greatly increase the rate and/or prevalence of irreversible ionic redox reactions of a battery, and resultantly deteriorate battery capacity. The term "cation mixing" may be expressed as a percentage (%), and may refer to a ratio (%) of nickel ($Ni^{2+}$) ions mixed in the lithium sites (Li sites) with respect to the total number of Li sites, and may be, for example, measured using X-ray diffraction (XRD).

As used herein, the term "surface portion" of the positive active material may refer to a region corresponding to about 10% or less, for example, about 9% or less, about 8% or less, about 7% or less, about 6% or less, or about 5% or less of a radius length of a positive active material particle and, for example, a region corresponding to about 1 μm or less, for example about 900 nm or less, about 800 nm or less, about 700 nm or less, about 700 nm or less, about 600 nm or less, or about 500 nm or less from the surface portion (e.g., outer surface) of the positive active material particle. As used herein, the term "bulk", referring to the positive active material, may refer to a region excluding the surface portion of the positive active material.

Methods of preparing the positive active material according to embodiments of the present disclosure may include a short term heat treatment (a first heat treatment) at a high temperature under a rapid temperature-increasing condition to create an atmosphere (e.g., conditions) in which a Li salt is included in excess relative to the Ni content of the composite transition metal hydroxide, thereby suppressing cation mixing in the surface portion of the positive active material. When the cation mixing satisfies the ranges, excellent capacity characteristics may be obtained, and high-temperature stability and cycle-life characteristics may be improved. However, as described above, when the first heat treatment is performed under a rapid temperature increase at a high temperature for a short time with an excessive amount of a lithium salt, cation mixing may be suppressed, but there is a problem of generating a large amount of unreacted residual lithium. However, the unreacted residual lithium may be effectively removed during the following second heat treatment.

A content (concentration) of residual lithium on the surface of the positive active material according to an embodiment may be less than or equal to about 3000 ppm (less than or equal to about 0.3 wt %). For example, the residual lithium content may be less than or equal to about 2500 ppm or less than or equal to about 2000 ppm. In general, when a high nickel-based composite transition metal oxide is included in a positive active material, the high content of nickel results in structural instability and generates a large amount of unreacted residual lithium. In addition, side reactions of the residual lithium with an electrolyte solution may be increased and may lead to gas generation and battery swelling. As such, washing and drying processes for removing the residual lithium are performed in the related art, but these processes may cause surface damage to the active material, increase production costs, and increase cation mixing. Embodiments of the present disclosure introduce a simple second heat treatment to effectively remove the residual lithium without causing surface damage to the positive active material and without increasing cation mixing.

The positive active material may have a BET specific surface area of less than or equal to about 0.5 m²/g, for example, less than or equal to about 0.4 m²/g, or less than or equal to about 0.3 m²/g. The positive active material has no or a reduced degree of surface damage and cation mixing compared to materials prepared using a washing process in the related art, and may thus exhibit significantly reduced BET specific surface area compared to such materials in the related art. Accordingly, the amount of generated heat may be significantly reduced, and a high-temperature cycle-life and/or a high temperature resistance increase rate of the battery may be improved.

The positive active material may have an exothermic peak at a temperature close to about 200° C., as measured by differential scanning calorimetry (DSC). For example, the positive active material may have an exothermic peak of about 190° C. to about 210° C., and the exothermic peak may have a maximum value of less than or equal to about 1,200 J/g (based on about 70 mg of a sample), for example, less than or equal to about 1,000 J/g. In this way, when the positive active material has a low exothermic peak in a high temperature range, high temperature stability of a battery may be improved and the possibility of explosion may be significantly reduced, even when the internal temperature of the battery is increased due to events such as battery malfunction and/or the like.

The positive active material may have a mixture density of about 3.2 g/cm³ to about 3.7 g/cm³, for example, about 3.4 g/cm³ to about 3.5 g/cm³. As described above, the first and second compounds having different particle diameters may be included (e.g., combined) to increase the mixture density of the positive active material and thereby the battery capacity.

One or more example embodiments of the present disclosure provide a method of preparing the positive active material.

Hereinafter, the preparing method is described in more detail.

The method includes mixing a Compound 1A represented by Chemical Formula 1A, a Compound 2A represented by Chemical Formula 2A, the Compound 2A having a smaller particle size than the Compound 1A, and a lithium salt to prepare a mixture, subjecting the mixture to a first heat treatment under a rapid temperature increase condition to produce a first fired product including residual lithium, subjecting the first fired product to a second heat treatment to prepare the positive active material.

Chemical Formula 1A

In Chemical Formula 1A,
0.9≤x1≤0.98, 0.01≤y1≤0.09, and M¹ may be at least one element selected from Mn, Al, Cr, Fe, V, Mg, Ti, Zr, Nb, Mo, W, Cu, Zn, Ga, In, Sn, La, and Ce.

Chemical Formula 2A

In Chemical Formula 2A,
0.9≤x2≤0.98, 0.01≤y2≤0.09, and M² may be at least one element selected from Mn, Al, Cr, Fe, V, Mg, Ti, Zr, Nb, Mo, W, Cu, Zn, Ga, In, Sn, La, and Ce.

In Chemical Formula 1A and Chemical Formula 2A, desirable or suitable compositions (atomic concentrations) of Ni, Co, M¹, and M² may each independently be the same as described in connection with the lithium transition metal oxides of Chemical Formulae 1 and 2 (first compound and second compound) described above. In some embodiments, the average particle diameters of the Compound 1A and the Compound 2A may be the same as or slightly smaller than the average particle diameters of the first compound and the second compound, respectively.

The lithium salt may be a lithium-containing carbonate (e.g., lithium carbonate (Li₂CO₃), etc.), hydroxide (e.g., lithium hydroxide (LiOH), etc.), hydrate (e.g., lithium hydroxide monohydrate (LiOH.H₂O), etc.), nitrate (e.g., lithium nitrate (LiNO₃)), and/or chloride (e.g., lithium chloride (LiCl)). One salt or a mixture of two or more salts may be used, and in some embodiments, lithium hydroxide (LiOH) may be used.

The lithium salt and the Compounds 1A and 2A may be mixed in a mole ratio of Li/(Ni+Co+Mn) of greater than or equal to about 0.97, for example, about 1.00 to about 1.05. When the mole ratio of the lithium salt and Compounds 1A and 2A are within the ranges, a large amount of unreacted lithium may remain on the surface of a first fired product (e.g., a residual amount of one or both of the first compound and the second compound) from the first heat treatment, and then, the residual lithium may react with one or both of Compounds 1A and 2A during the second heat treatment to prepare a positive active material including the first and second compounds.

The Compound 2A may be included in an amount of about 10 to about 50 wt %, for example, about 10 to about 40 wt % or about 10 to about 30 wt % based on a total amount of 100 wt % of the Compounds 1A and 2A.

The rapid temperature increase condition may be a process of increasing a temperature (e.g., reaction or treatment temperature) from a starting temperature of about 25° C. to about 100° C. to a first heat treatment temperature of about 800° C. to about 1000° C. at a rate of about 3° C./min to about 6° C./min. The rapid temperature increase process is performed for a short time, so that cation mixing may be prevented or reduced, and the first fired product may include a large amount of unreacted residual lithium.

The first heat treatment may be performed at a high temperature (about 800° C. to about 1000° C.) under an air atmosphere, an oxidizing gas atmosphere, or an oxygen atmosphere for a short time, for example, for about 1 hour to about 5 hours or about 2 hours to about 4 hours to produce a large amount of a nickel-based transition metal hydroxide (at least one of Compound 1A and Compound 2 Å) that does not participate in (e.g., is not used in) the reaction. Accordingly, generation of $Ni^{2+}$ is suppressed or reduced in order to suppress or decrease movement of $Ni^{2+}$ into Li sites, thereby preventing or reducing cation mixing of the positive active material and leaving a relatively large amount of unreacted residual lithium on the surface of at least one of the first and second compounds in the nickel-based lithium transition metal oxide.

The oxidizing gas atmosphere is a gas atmosphere including oxygen (02), and herein, the oxygen content may be about 20 volume % to about 40 volume %. In some embodiments, the oxygen atmosphere may have an oxygen content of about 40 volume % to about 100 volume %.

The first heat treatment may be performed at a charging height of greater than or equal to about 3 cm, for example, about 5 cm to about 8 cm. When the heat treatment process is performed by putting the mixture into a heat treatment equipment from a height of greater than or equal to about 3 cm, the cost of production may be suitable, and an amount of unreacted lithium remaining on the surface of the first fired product is increased and may thus suitably form a positive active material during the following second heat treatment.

The second heat treatment may be performed by increasing a temperature at a rate of about 3° C./min to about 10° C./min from a starting temperature of about 25° C. to about 100° C. up to a second heat treatment temperature of about 680° C. to about 900° C., maintaining conditions at about 700° C. to about 900° C. for about 3 hours to about 10 hours, and then, decreasing the temperature at a rate of about 2.5° C./min to about 5° C./min down to an ending temperature of about 25° C. to about 100° C.

The second heat treatment may be performed under the oxygen atmosphere.

Compound 2A may have a needle shape, a plate shape, or a combination thereof, and the second compound prepared from the positive active material manufacturing method may keep the shape of Compound 2A (e.g., may also have a needle shape, a plate shape, or a combination thereof).

One or more example embodiments of the present disclosure provide a positive electrode including the positive active material.

The positive electrode includes a current collector, and a positive active material layer disposed on the current collector and including a positive active material.

In the positive active material layer, a content of the positive active material may be about 90 wt % to about 98 wt % based on a total weight of 100 wt % of the positive active material layer. In some embodiments, the positive active material layer may further include a binder and a conductive material. The content of each of the binder and the conductive material may be about 1 wt % to about 5 wt % based on a total weight of the positive active material layer.

The positive active material may be the same as described above.

The binder may include polyvinyl alcohol, carboxymethyl cellulose, hydroxypropyl cellulose, diacetyl cellulose, polyvinyl chloride, polyvinyl fluoride, polyvinylpyrrolidone, polyurethane, polytetrafluoroethylene, polyvinylidene fluoride, polyethylene, polypropylene, a styrene-butadiene rubber, an acrylated styrene butadiene rubber, an epoxy resin, nylon, and the like, but is not limited thereto.

Non-limiting examples of the conductive material include carbon materials (such as natural graphite, artificial graphite, carbon black, acetylene black, ketjen black, and/or a carbon fiber); a metal powder and/or fiber (such as copper, nickel, aluminum, and/or silver); a conductive polymer (such as a polyphenylene derivative); or a mixture thereof.

The current collector may be an aluminum foil, a nickel foil, or a combination thereof, but is not limited thereto.

One or more example embodiments of the present disclosure provide a rechargeable lithium battery including the positive electrode; a negative electrode; and an electrolyte between the positive electrode and the negative electrode.

The positive electrode may be the same as described above.

The negative electrode may include a current collector and a negative active material layer formed on the current collector and including a negative active material.

The negative active material may include a material that reversibly intercalates/deintercalates lithium ions, a lithium metal, a lithium metal alloy, a material capable of doping/dedoping lithium, and/or a transition metal oxide.

The material that reversibly intercalates/deintercalates lithium ions may be or include a carbonaceous material. The carbonaceous material may be any carbon-based negative active material used in the related art in a rechargeable lithium ion battery. Non-limiting examples thereof include crystalline carbon, amorphous carbon, and a mixture thereof. The crystalline carbon may be non-shaped (e.g., have no set or particular shape), or sheet, flake, spherical, and/or fiber shaped natural graphite and/or artificial graphite. The amorphous carbon may be a soft carbon, a hard carbon, a mesophase pitch carbonization product, fired coke, and/or the like.

The lithium metal alloy includes an alloy of lithium and a metal selected from Na, K, Rb, Cs, Fr, Be, Mg, Ca, Sr, Si, Sb, Pb, In, Zn, Ba, Ra, Ge, Al, and Sn.

The material capable of doping/dedoping lithium may be Si, $SiO_x$ (0<x<2), a Si-Q alloy (wherein Q is an element selected from an alkali metal, an alkaline-earth metal, a Group 13 element, a Group 14 element excluding Si, a Group 15 element, a Group 16 element, a transition metal, a rare earth element, and a combination thereof), Sn, $SnO_2$, a Sn—R alloy (wherein R is an element selected from an alkali metal, an alkaline-earth metal, a Group 13 element, a Group 14 element excluding Sn, a Group 15 element, a Group 16 element, a transition metal, a rare earth element, and a combination thereof), and/or the like. At least one of these materials may be mixed with $SiO_2$. The elements Q and R may each independently be selected from Mg, calcium (Ca), strontium (Sr), barium (Ba), radium (Ra), scandium (Sc), yttrium (Y), Ti, Zr, hafnium (Hf), rutherfordium (Rf), V, Nb, tantalum (Ta), dubnium (Db), Cr, Mo, W, seaborgium (Sg), technetium (Tc), rhenium (Re), bohrium (Bh), Fe, lead (Pb), ruthenium (Ru), osmium (Os), hassium (Hs), rhodium (Rh), iridium (Ir), palladium (Pd), platinum (Pt), Cu, silver (Ag), gold (Au), Zn, cadmium (Cd), boron (B), Al, Ga, Sn, In, thallium (Tl), germanium (Ge), phosphorus (P), arsenic (As), antimony (Sb), bismuth (Bi), sulfur (S), selenium (Se), tellurium (Te), polonium (Po), and a combination thereof.

The transition metal oxide may be vanadium oxide, lithium vanadium oxide, or lithium titanium oxide.

In the negative active material layer, the negative active material may be included in an amount of about 95 wt % to about 99 wt % based on a total weight of 100 wt % of the negative active material layer.

In an embodiment, the negative active material layer includes a binder, and may optionally further include a conductive material. A content of the binder in the negative active material layer may be about 1 wt % to about 5 wt % based on a total weight of 100 wt % of the negative active material layer. When the negative active material layer further includes a conductive material, the negative active material layer may include about 90 wt % to about 98 wt % of the negative active material, about 1 wt % to about 5 wt % of the binder, and about 1 wt % to about 5 wt % of the conductive material.

The binder may improve binding of the negative active material particles with one another and with a current collector. The binder includes a non-water-soluble binder, a water-soluble binder, or a combination thereof.

The non-water-soluble binder may include polyvinylchloride, carboxylated polyvinylchloride, polyvinyl fluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may include a styrene-butadiene rubber, an acrylated styrene-butadiene rubber (SBR), an acrylonitrile-butadiene rubber, an acrylic rubber, a butyl rubber, a fluorine rubber, an ethylene propylene copolymer, polyepichlorohydrine, polyphosphazene, polyacrylonitrile, polystyrene, ethylene propylenediene copolymer, polyvinylpyridine, chlorosulfonated polyethylene, latex, a polyester resin, an acrylic resin, a phenolic resin, an epoxy resin, polyvinyl alcohol, or a combination thereof.

When the water-soluble binder is used as a negative electrode binder, a cellulose-based compound may be further included or used as a thickener to provide viscosity. The cellulose-based compound includes one or more of carboxymethyl cellulose, hydroxypropylmethyl cellulose, methyl cellulose, or alkali metal salts thereof. The alkali metals may be sodium (Na), potassium (K), or Li. The thickener may be included in an amount of about 0.1 to about 3 parts by weight based on 100 parts by weight of the negative active material.

The conductive material may include: a carbon-based material such as natural graphite, artificial graphite, carbon black, acetylene black, ketjen black, a carbon fiber, and/or the like; a metal-based material of a metal powder or a metal fiber including copper, nickel, aluminum, silver, and/or the like; a conductive polymer such as a polyphenylene derivative; or a mixture thereof.

The current collector may include at least one selected from a copper foil, a nickel foil, a stainless steel foil, a titanium foil, a nickel foam, a copper foam, a polymer substrate coated with a conductive metal, and a combination thereof.

The electrolyte may include a non-aqueous organic solvent and a lithium salt.

The non-aqueous organic solvent serves as a medium for transmitting ions taking part in the electrochemical reaction of a battery.

The non-aqueous organic solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), methyl acetate, ethyl acetate, n-propyl acetate, dimethylacetate, methyl propionate, ethyl propionate, decanolide, mevalonolactone, caprolactone, dibutyl ether, tetraglyme, diglyme, dimethoxyethane, 2-methyltetrahydrofuran, tetrahydrofuran, cyclohexanone, ethanol, isopropyl alcohol, nitriles such as R—CN (where R may be a C2 to C20 linear, branched, or cyclic hydrocarbon group and R may include a double bond, an aromatic ring, and/or an ether bond), and/or the like, amides such as dimethyl formamide and/or the like, dioxolanes such as 1,3-dioxolane and/or the like, sulfolanes, and/or the like.

The organic solvent may be used alone or in a mixture of two or more, and a mixing ratio when used in a mixture of two or more may be appropriately or suitable adjusted according to desired or suitable battery performance, as understood by those having ordinary skill in the art.

In some embodiments, the organic solvent may further include an aromatic hydrocarbon-based organic solvent. Non-limiting examples of the aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4 trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and combinations thereof.

The electrolyte may further include an additive of vinylene carbonate or an ethylene carbonate-based compound as a cycle-life improvement additive.

Non-limiting examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the cycle-life improvement additive may be within an appropriate or suitable range, as understood by those having ordinary skill in the art.

The lithium salt dissolved in an organic solvent supplies a battery with lithium ions, enables basic operation of the rechargeable lithium battery, and facilitates lithium ion transport between a positive electrode and a negative electrode. Non-limiting examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, (wherein x and y are natural numbers, for example an integer of 1 to 20), LiCl, LiI, and $LiB(C_2O_4)_2$ (lithium bis(oxalato) borate, LiBOB). A concentration of the lithium salt may be about 0.1 M to about 2.0 M. When the lithium salt is included at the above concentration range, an electrolyte may have excellent performance and/or lithium ion mobility due to optimal or suitable electrolyte conductivity and/or viscosity.

The rechargeable lithium battery may further include a separator between the negative electrode and the positive electrode, depending on the type or format of battery. Non-limiting examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Figure 1:
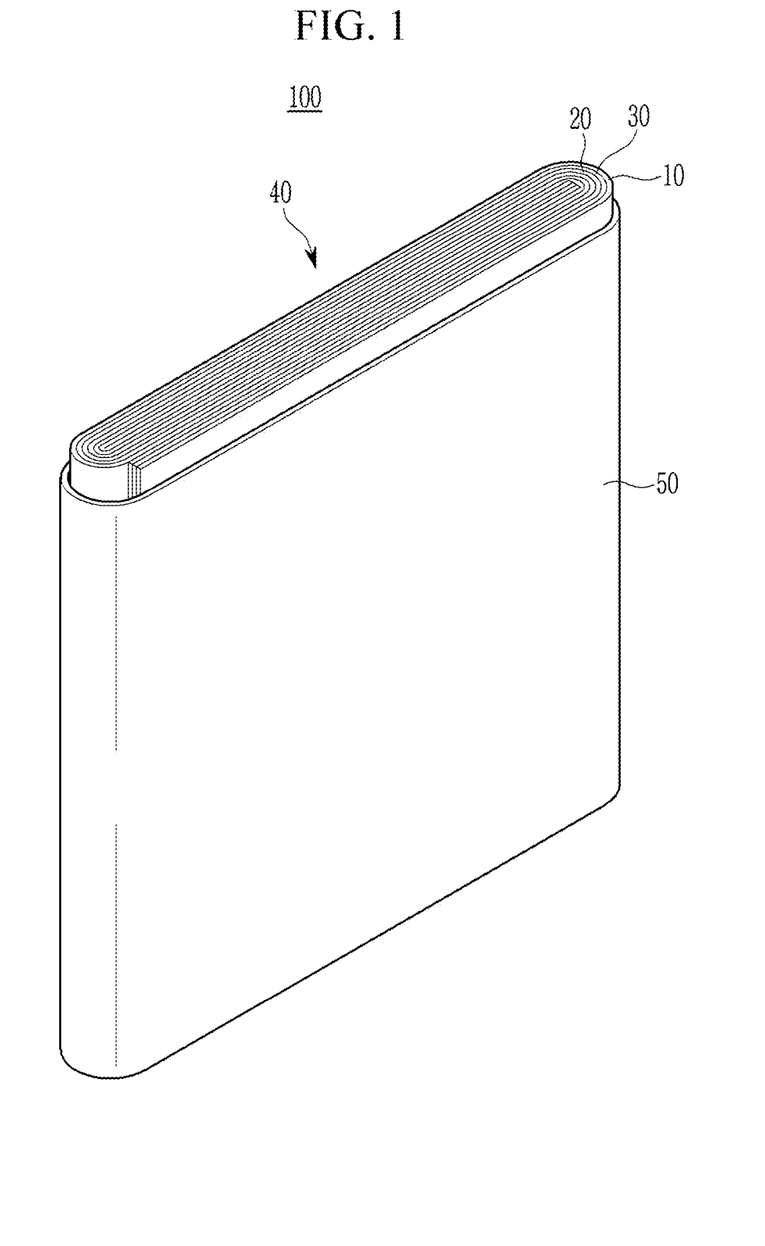
FIG. 1 is a schematic view showing the structure of a rechargeable lithium battery according to an embodiment.

FIG. 1 is an exploded perspective view of a rechargeable lithium battery according to an embodiment. The rechargeable lithium battery according to an embodiment is illustrated as a prismatic battery but is not limited thereto, and may include variously-shaped batteries (such as a cylindrical battery, a pouch battery, coin-type, and/or the like).

Referring to FIG. 1, a rechargeable lithium battery 100 according to an embodiment includes an electrode assembly 40 produced by winding a separator 30 disposed between a positive electrode 10 and a negative electrode 20, and a battery case 50 housing the electrode assembly 40. An electrolyte may be impregnated in the positive electrode 10, the negative electrode 20, and the separator 30.

Hereinafter, embodiments of the present disclosure are described in more detail so that those skilled in the relevant art may easily practice the embodiments. As those skilled in the art would realize, the described embodiments may be modified in various different ways, all without departing from the spirit or scope of the present disclosure.

Example 1

Lithium hydroxide (LOH), $Ni_{0.98}Co_{0.02}(OH)_2$, and $Al_2O_3$ were mixed in a Li:(Ni+Co+Al) mole ratio of 1.025:1.00 to prepare a mixture. The $Ni_{0.98}Co_{0.02}(OH)_2$ was obtained by mixing Compounds 1A and 2A having the same composition but different particle diameters in a weight ratio of 8:2. Then, the mixture was heated from 25° C. to 900° C. at a rate of 5° C./min, maintained at 900° C. for 4 hours, and cooled down to 25° C. at a rate of 5° C./min as a first heat treatment to obtain a first fired product. The first heat treatment process was performed at a charging height of 5 cm under an oxygen atmosphere.

The first fired product was dry-mixed with 2.5 mol % of $Co(OH)_2$ to prepare a second mixture. The second mixture was heated at a rate of 5° C./min from 25° C. to 700° C., maintained at 700° C. for 10 hours, and cooled down at a rate of 5° C./min to 25° C. as a second heat treatment to prepare a $Li_{1.00}Ni_{0.94}Co_{0.045}Al_{0.015}O_2$ positive active material including the first and second compounds in a weight ratio of 8:2. The second heat treatment was performed under an oxygen atmosphere.

Herein, an average particle diameter (D50) of the first compound was 18 μm, an average particle diameter (D50) of the second compound was 3 μm, and an average of the average particle diameters (D50) of the first and second compounds was 16.5 μm. The second compound had a mixed shape of needle shape and sheet-shape.

Example 2

A positive active material including the first compound $(Li_{1.00}Ni_{0.94}Co_{0.045}Al_{0.015}O_2)$ and the second compound $(Li_{1.00}Ni_{0.94}Co_{0.045}Al_{0.015}O_2)$ in a weight ratio of 8:2 was prepared according to substantially the same method as Example 1, except that Compounds 1A and 2A having a composition of $Ni_{0.98}Co_{0.02}O$ was used instead of $Ni_{0.98}Co_{0.02}(OH)_2$.

Comparative Example 1

A first fired product was washed with the same weight of water for 20 minutes, and then dried at 200° C. for 8 hours. The washed and dried first fired product was mixed with 2.5 mol % of $Co(OH)_2$ to prepare a second mixture, and the other processes were performed according to substantially the same method as Example 1 to prepare a positive active material.

Evaluation Example 1: TEM Analysis Result of Surface of Positive Active Material The positive active materials according to Example 1 and Comparative Example 1 were evaluated for surface damage using bright-field transparent electron microscopy (TEM) and diffraction analysis. The results are respectively shown in FIGS. 2A and 2B. The surface damage of the positive active materials was evaluated by measuring thicknesses of spinel phases on the surfaces (e.g., as distinguished from the layered phase of the bulk material).

Figure 2A:
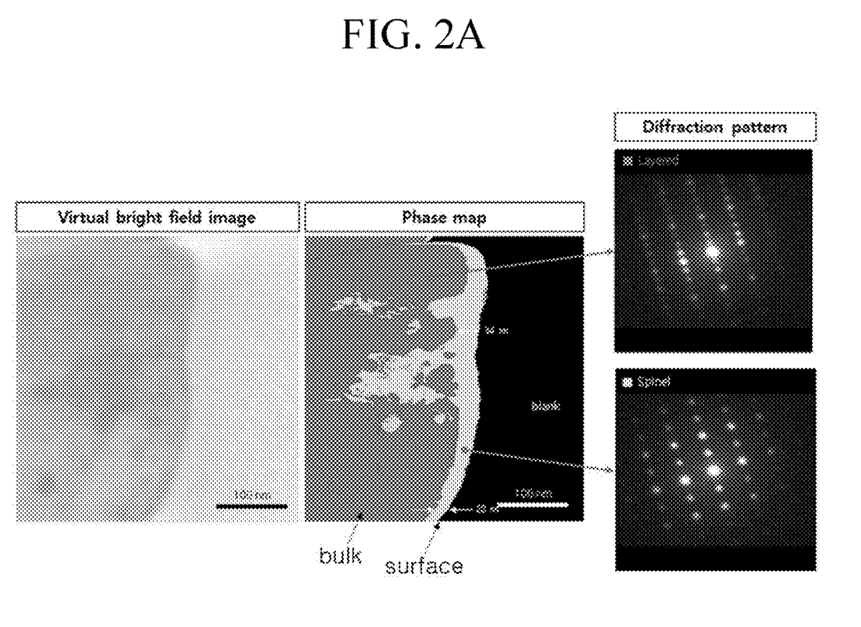
FIGS. 2A and 2B are surface transmission electron microscope (TEM) images of the positive active materials according to Example 1 and Comparative Example 1, respectively.
Figure 2B:
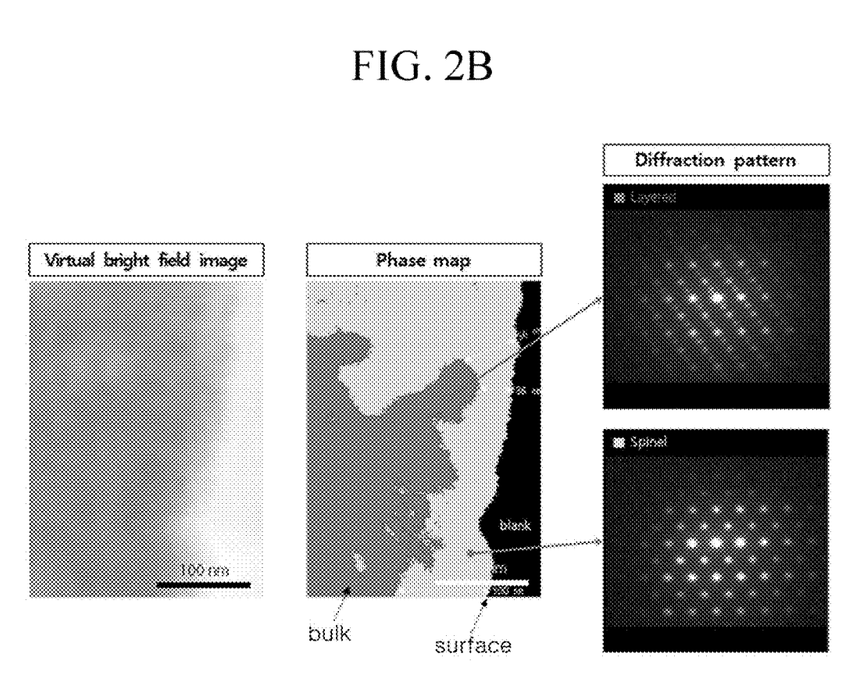

Referring to FIGS. 2A and 2B, the positive active material of Comparative Example 1 had a surface portion having a spinel phase with a thickness of 35 to 100 nm, attributed to the washing and drying processes for removing residual lithium, while the positive active material of Example 1 had a surface portion having a spinel phase with a thickness of 20 to 34 nm and thus had a relatively large portion of layered phase than that of Comparative Example 1. Accordingly, the positive active material of Example 1 had relatively less surface damage than that of Comparative Example 1.

Evaluation Example 2: Analysis of Cation Mixing

An XRD analysis was performed on the positive active material powders according to Example 1 and Comparative Example 1. The XRD analysis was performed using an Xpert PRO (Power 3 kW, Koninklijke Philips N.V.), and a Rietveld analysis was performed to measure the degree of cation mixing in the surface portion and the bulk of each positive active material. The results are shown in Table 1. In the XRD analysis, a CuK-alpha characteristic X-ray wavelength of 1.541 Å was used as an excitation source.

TABLE 1

| | Cation mixing in surface portion of positive active material (%) | Cation mixing in bulk of positive active material (%) |
|---|---|---|
| Example 1 | 6.1 | 2.4 |
| Comparative Example 1 | 7.7 | 2.3 |

Referring to Table 1, the bulk of the positive active material of Example 1 exhibited similar cation mixing to that of Comparative Example 1, but the surface portion of the positive active material of Example 1 exhibited decreased cation mixing compared with that of Comparative Example having no washing process.

Evaluation Example 3: Evaluation of Content of Residual Lithium on the Surface of Positive Active Material 10 g of each positive active material of Examples 1 and 2 and Comparative Example 1 was respectively dispersed in 100 mL of water and then, titrated by 0.1 M of HCl to obtain a pH titration curve. The pH titration curve was used to calculate the residual amount of Li (in the form of LiOH and $Li_2CO_3$) in each positive active material, as shown in Table 2.

TABLE 2

| | Content of residual lithium (ppm) |
|---|---|
| Example 1 | 2,500 |
| Example 2 | 2,200 |

Referring to Table 2, the positive active materials of Examples 1 and 2 exhibited a surface residual lithium amount of less than or equal to 3,000 ppm.

Evaluation Example 4: Evaluation of Initial Charge and Discharge Capacity 94 wt % of each positive active material of Examples 1 and 2 and Comparative Example 1, 3 wt % of ketjen black, and 3 wt % of polyvinylidene fluoride were mixed in an N-methyl pyrrolidone solvent to prepare positive active material slurries. The positive active material slurries were respectively coated on an Al film, and then dried and compressed to produce positive electrodes. Each positive electrode, a lithium metal counter electrode, and an electrolyte solution were used in a common method to produce 2032 type half-cells. The produced half-cells were once charged and discharged at 0.2 C, and the charge capacity, discharge capacity, and charge/discharge efficiency thereof are shown in Table 3.

The electrolyte solution was prepared by dissolving 1.0 M $LiPF_6$ in a mixed solvent of ethylene carbonate and dimethyl carbonate (in a volume ratio of 50:50=EC:DMC).

TABLE 3

| | Charge capacity (mAh/g) | Discharge capacity (mAh/g) | Charge and discharge efficiency (%) |
|---|---|---|---|
| Example 1 | 243 | 217.5 | 89.5 |
| Example 2 | 242 | 216.1 | 89.3 |
| Comparative Example 1 | 243 | 212.1 | 87.3 |

Referring to Table 3, the half-cells produced using the positive active materials of Examples 1 and 2 exhibited improved charge capacity, discharge capacity, and charge and discharge efficiency compared with that of Comparative Example 1.

Evaluation Example 5: Evaluation of Cycle-Life Characteristics

The half-cells produced in Evaluation Example 4 were charged under constant current-constant voltage at 1 C (1 C=200 mAh/g) under a cut-off condition of 4.25 V and 0.05 C, and discharged under constant current at 1 C under a cut-off condition of 3.0 V at room temperature (25° C.), which was regarded as 1 cycle and repeated up to 50 cycles. The ratio of discharge capacity at the 50th cycle relative to the discharge capacity at the 1st cycle was calculated as capacity retention and then, shown in Table 4.

TABLE 4

| | Capacity retention (%) |
|---|---|
| Example 1 | 93 |
| Example 2 | 91 |
| Comparative Example 1 | 84 |

Referring to Table 4, the half-cells produced using the positive active materials of Examples 1 and 2 exhibited improved room temperature capacity retention compared with that of Comparative Example 1.

Evaluation Example 6: Evaluation of Heat Flow

The positive active materials of Example 1 and Comparative Example 1 were measured for heat flow with respect to temperature using differential scanning calorimetry (DSC). A differential scanning calorimeter (SENSYS Evo, Setaram Instrumentation) was used for the measurement, in which 15 mg of each electrode was charged at 4.25 V (vs. $Li/Li^+$), and 20 μl of an electrolyte solution was added thereto and heated up to 400° C. at 10° C./min. The measured results are shown in Table 5 and FIG. 3.

The electrolyte solution was prepared by dissolving 1.0 M $LiPF_6$ in a mixed solvent of ethylene carbonate and dimethyl carbonate (in a volume ratio of 50:50=EC:DMC).

TABLE 5

| | Onset temp (° C.) | Peak temp (° C.) |
|---|---|---|
| Example 1 | 203.29 | 205.65 |
| Comparative Example 1 | 185.51 | 196.86 |

Figure 3:
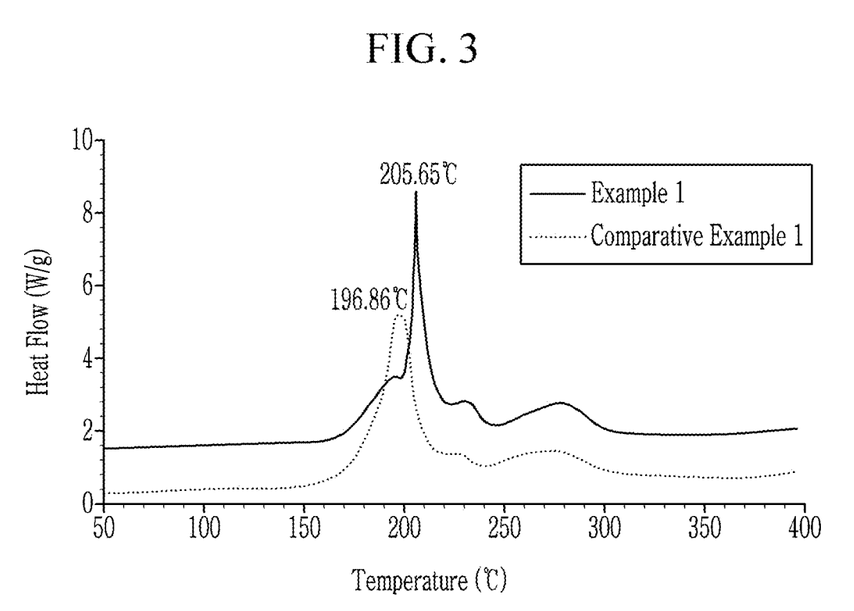
FIG. 3 is a graph showing heat flow according to temperature, as measured by differential scanning calorimetry (DSC) for the positive active materials according to Example 1 and Comparative Example 1.

Referring to Table 5 and FIG. 3, an on-set temperature and a peak temperature of the positive active material of Example 1 were higher than those of the positive active material of Comparative Example 1, and the positive active material according to Example 1 exhibited a greatly improved DSC on-set temperature and thus excellent high temperature stability compared with the positive active material according to Comparative Example 1.

As used herein, the terms "substantially," "about," and similar terms are used as terms of approximation and not as terms of degree, and are intended to account for the inherent deviations in measured or calculated values that would be recognized by those of ordinary skill in the art.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims and equivalents thereof.

DESCRIPTION OF SOME OF THE SYMBOLS

10: positive electrode
20: negative electrode
30: separator
40: electrode assembly
50: battery case
100: rechargeable lithium battery

What is claimed is:

1. A positive active material for a rechargeable lithium battery, the positive active material comprising:
   a first compound represented by Chemical Formula 1 and a second compound represented by Chemical Formula 2, the second compound having a smaller particle size than the first compound,
   wherein the first compound and the second compound each independently comprise Ni in an amount of about 91 at % to about 98 at % with respect to 100 at % of metals excluding Li,
   a degree of cation mixing in a surface portion of the positive active material is less than or equal to about 7.5%,
   a degree of cation mixing in a bulk of the positive active material is less than or equal to about 3%, and
   a concentration of residual lithium on a surface of the positive active material is less than or equal to about 3,000 ppm:

$$Li_{a1}Ni_{x1}Co_{y1}M^1{}_{1-x1-y1}O_2, \quad \text{Chemical Formula 1}$$

wherein, in Chemical Formula 1,
$0.9 \le a1 \le 1.05$, $0.9 \le x1 \le 0.98$, $0.01 \le y1 \le 0.09$, $M^1$ is at least one element selected from Mn, Al, Cr, Fe, V, Mg, Ti, Zr, Nb, Mo, W, Cu, Zn, Ga, In, Sn, La, and Ce, and $$Li_{a2}Ni_{x2}Co_{y2}M^2{}_{1-x2-y2}O_2, \quad \text{Chemical Formula 2}$$

wherein, in Chemical Formula 2,
$0.9 \le a2 \le 1.05$, $0.9 \le x2 \le 0.98$, $0.01 \le y2 \le 0.09$, and $M^2$ is at least one element selected from Mn, Al, Cr, Fe, V, Mg, Ti, Zr, Nb, Mo, W, Cu, Zn, Ga, In, Sn, La, and Ce.

2. The positive active material of claim 1, wherein the first compound has an average particle diameter of about 15 μm to about 20 μm, and
   the second compound has an average particle diameter of about 2 μm to about 5 μm.

3. The positive active material of claim 1, wherein the second compound is included in an amount of about 10 wt % to about 50 wt % based on a total amount of 100 wt % of the first compound and the second compound.

4. The positive active material of claim 1, wherein the second compound has a needle shape, a plate shape, or a combination thereof.

5. The positive active material of claim 1, wherein the positive active material has a BET specific surface area of less than or equal to about 0.5 m²/g.

6. The positive active material of claim 1, wherein the positive active material has an exothermic peak at a temperature of about 190° C. to about 210° C. when measured by differential scanning calorimetry (DSC).

7. The positive active material of claim 1, wherein the positive active material has a mixture density of about 3.2 g/cm³ to about 3.7 g/cm³.

8. A positive electrode comprising the positive active material of claim 1.

9. A rechargeable lithium battery comprising:
   the positive electrode of claim 8;
   a negative electrode; and
   an electrolyte impregnated in the positive electrode and the negative electrode.

10. The positive active material of claim 1, wherein a thickness of a spinel phase on the surface portion of the positive active material is less than or equal to about 34 nm.

* * * * *

UNITED STATES PATENT AND TRADEMARK OFFICE
CERTIFICATE OF CORRECTION

PATENT NO. : 12,062,786 B2  
APPLICATION NO. : 16/940637  
DATED : August 13, 2024  
INVENTOR(S) : Eunok Oh et al.

Page 1 of 1

It is certified that error appears in the above-identified patent and that said Letters Patent is hereby corrected as shown below:

In the Claims

In Column 18, Line 6, in Claim 1, delete "$0.9 \leq x1 \leq 0.98$," and insert -- $0.91 \leq x1 \leq 0.98$, --.

In Column 18, Line 11, in Claim 1, delete "$0.9 \leq x2 < 0.98$," and insert -- $0.91 \leq x2 \leq 0.98$, --.

Signed and Sealed this  
Twenty-fourth Day of December, 2024

Derrick Brent  
*Acting Director of the United States Patent and Trademark Office*